United States Patent
Griffith

(10) Patent No.: US 8,244,428 B2
(45) Date of Patent: Aug. 14, 2012

(54) AUTOMATIC FORE-AFT DETECTION FOR AN AIRCRAFT

(75) Inventor: T. Todd Griffith, Seattle, WA (US)

(73) Assignee: The Boeing Company, Chicago, IL (US)

( * ) Notice: Subject to any disclaimer, the term of this patent is extended or adjusted under 35 U.S.C. 154(b) by 1526 days.

(21) Appl. No.: 11/382,585

(22) Filed: May 10, 2006

(65) Prior Publication Data

US 2007/0265739 A1 Nov. 15, 2007

(51) Int. Cl.
*G06F 19/00* (2011.01)
*G05D 1/00* (2006.01)

(52) U.S. Cl. .......... 701/33.3; 701/1; 701/3; 701/4; 701/71; 701/82

(58) Field of Classification Search .......... 701/35, 701/71, 3, 82; 364/428, 449; 318/586; 303/126
See application file for complete search history.

(56) References Cited

U.S. PATENT DOCUMENTS

| | | | |
|---|---|---|---|
| 4,482,961 A * | 11/1984 | Kilner et al. | 701/16 |
| 5,267,166 A | 11/1993 | Takata et al. | |
| 6,142,585 A * | 11/2000 | Gowan et al. | 303/126 |
| 6,671,588 B2 * | 12/2003 | Otake et al. | 701/3 |
| 7,286,909 B2 * | 10/2007 | Darke | 701/3 |
| 2003/0120413 A1 * | 6/2003 | Park et al. | 701/71 |
| 2004/0140715 A1 * | 7/2004 | Park et al. | 303/126 |
| 2004/0220714 A1 * | 11/2004 | Rudd, III | 701/71 |
| 2005/0159873 A1 * | 7/2005 | Rudd, III | 701/70 |
| 2005/0200198 A1 * | 9/2005 | Rudd, III | 303/167 |
| 2005/0251306 A1 * | 11/2005 | Gowan et al. | 701/35 |
| 2006/0080021 A1 * | 4/2006 | Park et al. | 701/71 |
| 2008/0030069 A1 * | 2/2008 | Griffith et al. | 303/20 |
| 2008/0073970 A1 * | 3/2008 | Griffith | 303/152 |
| 2008/0099603 A1 * | 5/2008 | Yamamoto et al. | 244/110 A |
| 2008/0149436 A1 * | 6/2008 | Griffith et al. | 188/110 |
| 2008/0154443 A1 * | 6/2008 | Godo | 701/3 |
| 2008/0154470 A1 * | 6/2008 | Goranson et al. | 701/70 |

* cited by examiner

*Primary Examiner* — Khoi Tran
*Assistant Examiner* — Ian Jen
(74) *Attorney, Agent, or Firm* — Yee & Associates, P.C.

(57) ABSTRACT

An automatic fore/aft detection procedure as described herein may be implemented in connection with an aircraft brake control system that utilizes wheel-mounted accelerometers that detect landing gear acceleration for purposes of antiskid control. The fore/aft detection procedure automatically determines that the aircraft is moving in a forward direction based upon the current wheel speed and rotational direction of the wheels. Once detected, forward direction is assigned to the rotational direction of each wheel (clockwise or counterclockwise) and a fore/aft orientation can be assigned to the accelerometer for each wheel.

11 Claims, 4 Drawing Sheets

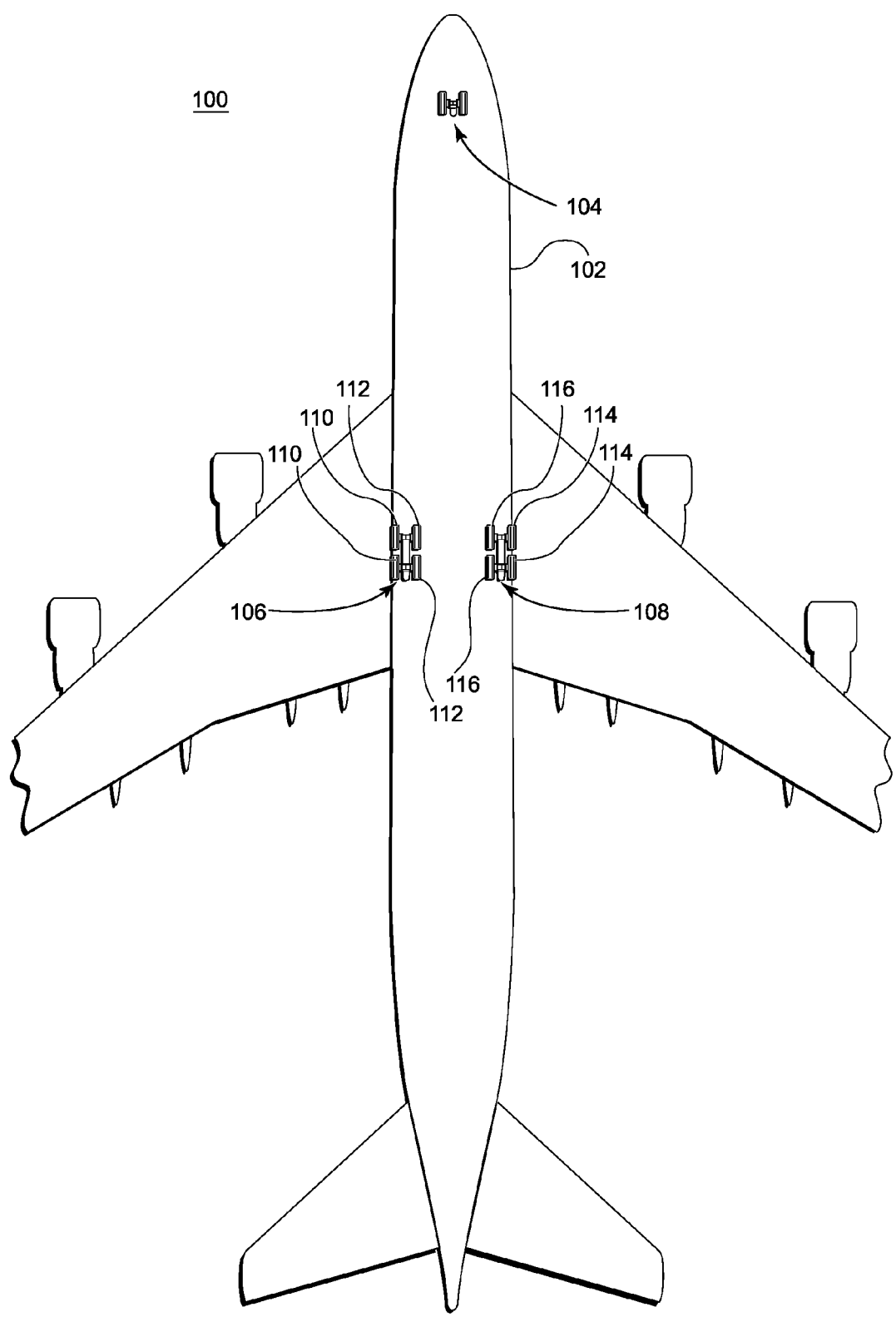
*FIG. 1 - PRIOR ART*

AUTOMATIC FORE-AFT DETECTION FOR AN AIRCRAFT

TECHNICAL FIELD

Embodiments of the present invention relate generally to aircraft control systems. More particularly, embodiments of the present invention relate to a direction detection technique for use in connection with an aircraft brake control system.

BACKGROUND

Electronic control and operating systems are becoming increasingly common in vehicles such as aircraft. For example, electronic braking systems and electronic stability systems are gaining favor in new aircraft designs. An antiskid feature of an aircraft electronic braking system may utilize one or more accelerometers that are designed to detect fore/aft acceleration of the aircraft landing gear during braking maneuvers. This directional acceleration data can be utilized as an input to the antiskid control system to augment landing gear strut stability when antiskid control is active.

Accelerometers typically need to be configured with at least one known orientation or direction. For example, in an aircraft application, an accelerometer may need to be physically positioned and/or electronically configured such that it can distinguish between the fore and aft directions of the aircraft. In connection with an antiskid feature, proper accelerometer orientation enables the landing gear stability algorithms to augment stability by applying brakes out of phase with the fore/aft deflection of the landing gear. In this regard, a conventional accelerometer deployment may require a technician to confirm that the accelerometer hardware is installed in a specific position and orientation relative to the aircraft and/or perform an electronic initialization or pin setting that indicates the fore/aft orientation of the accelerometer hardware. This conventional methodology may result in incorrect installation of accelerometers, and does not enable accelerometer hardware to be freely exchanged from one location to another without reconfiguring the hardware.

Accordingly, it is desirable to have a technique for automatically detecting the fore/aft orientation of an aircraft. In addition, it is desirable to have a technique for automatically configuring accelerometers used for aircraft antiskid control systems. Furthermore, other desirable features and characteristics of embodiments of the present invention will become apparent from the subsequent detailed description and the appended claims, taken in conjunction with the accompanying drawings and the foregoing technical field and background.

BRIEF SUMMARY

Systems and methods as described herein can be implemented in an aircraft to automatically detect the fore/aft orientation of a measurement device mounted on the aircraft. The fore/aft detection may be utilized to configure an accelerometer that provides acceleration data to an antiskid control mechanism for the aircraft.

The above and other aspects of the invention may be carried out in one embodiment by a method for detecting direction of motion of an aircraft having an axle-mounted remote data concentrator ("RDC") coupled to a wheel of the aircraft. The method involves: obtaining, at the RDC, a speed value and a rotational direction for the wheel of the aircraft; comparing the speed value to a threshold value; and assigning a forward motion indicator to the rotational direction if the speed value exceeds the threshold value.

The above and other aspects of the invention may be carried out in another embodiment by a method for automatically detecting direction of motion for an axle-mounted RDC coupled to a wheel of an aircraft. The method involves: processing, by the RDC, a speed value and a clockwise-counterclockwise indicator for the wheel of the aircraft; comparing the speed value to a threshold value; and correlating forward motion to the clockwise-counterclockwise indicator if the speed value exceeds the threshold value.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

FIG. 1 is a top schematic view of a prior art aircraft configuration showing the general location of the aircraft landing gear and wheels;

DETAILED DESCRIPTION

The following detailed description is merely illustrative in nature and is not intended to limit the embodiments of the invention or the application and uses of such embodiments. Furthermore, there is no intention to be bound by any expressed or implied theory presented in the preceding technical field, background, brief summary or the following detailed description.

Embodiments of the invention may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present invention may be practiced in conjunction with any number of data transmission protocols and that the system described herein is merely one example embodiment of the invention.

For the sake of brevity, conventional techniques and components related to signal processing, aircraft braking, antiskid control, accelerometer operation, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention.

Figure 5:
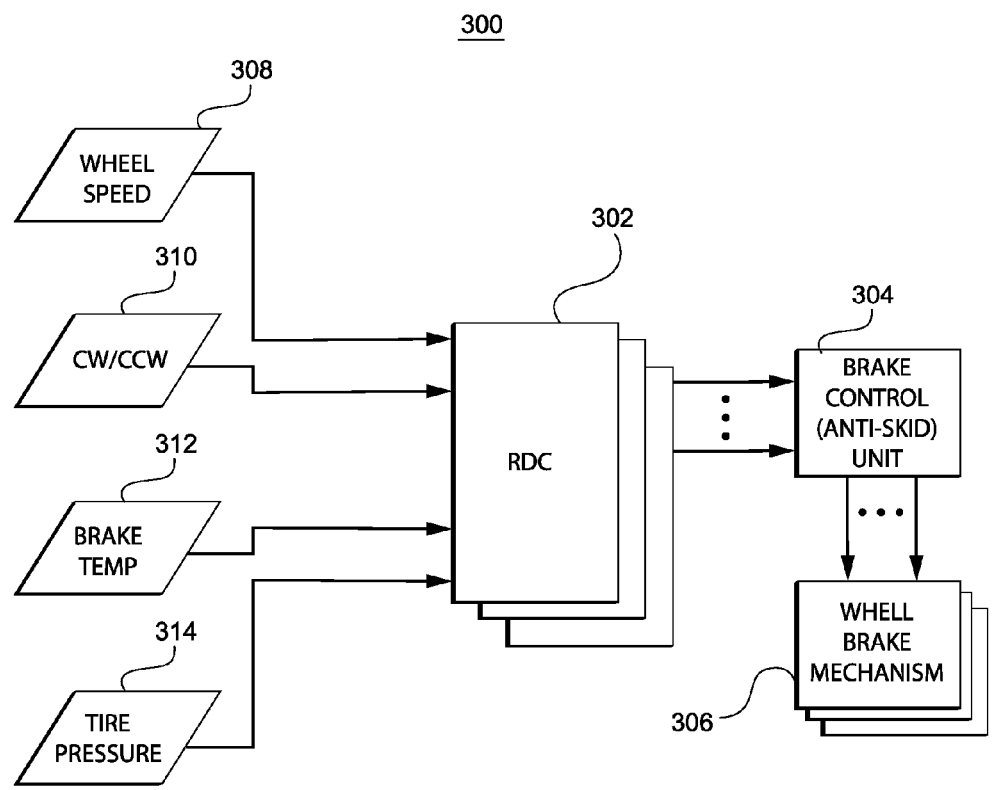
FIG. 5 is a schematic representation of an aircraft brake control system configured in accordance with an example embodiment of the invention.
Figure 6:
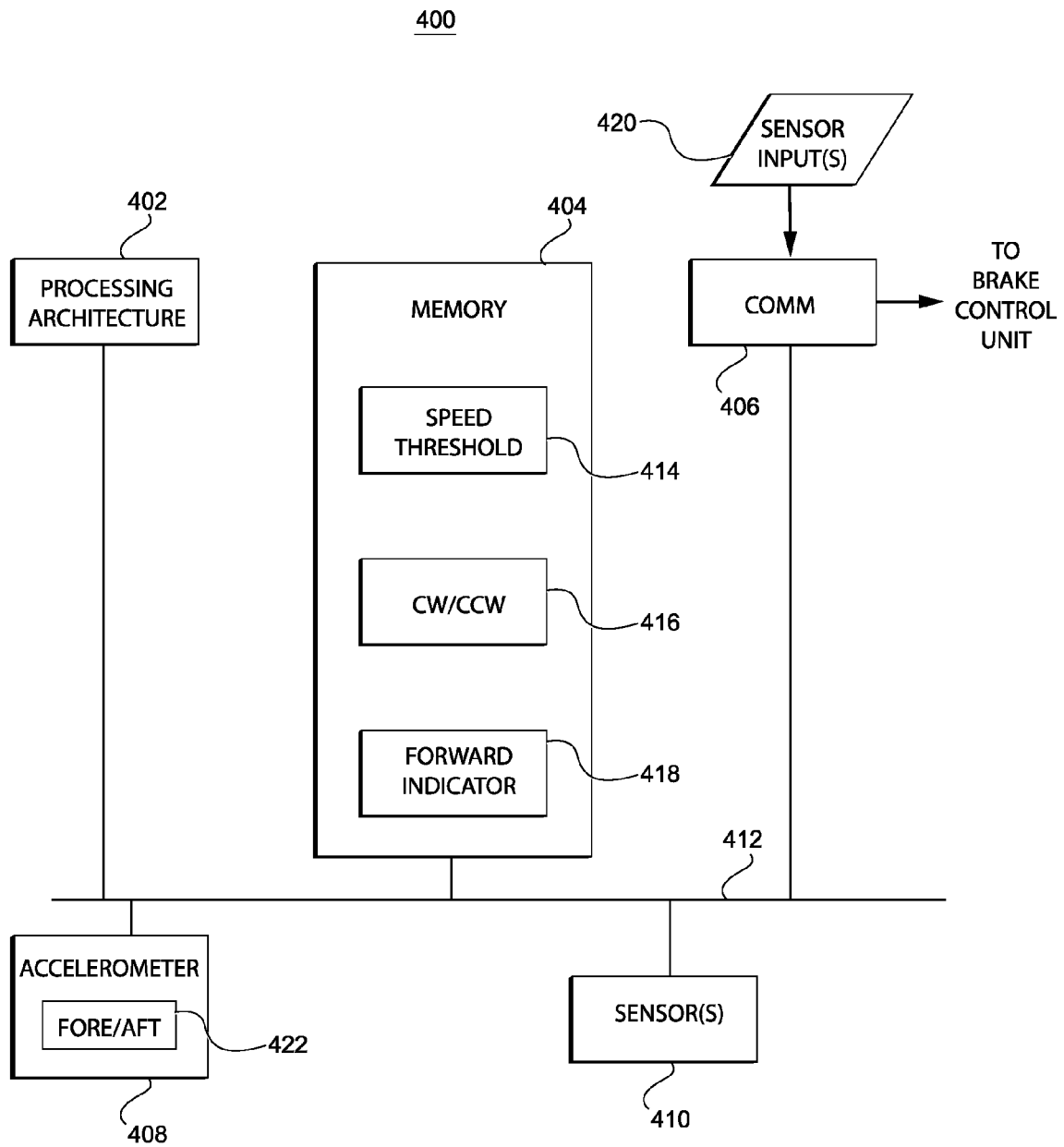
FIG. 6 is a schematic representation of an axle-mounted remote data concentrator configured in accordance with an example embodiment of the invention.

The following description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although the schematics shown in FIG. 5 and FIG. 6 depict example arrangements of elements, additional intervening elements, devices, features, or components may be present in an embodiment of the invention (assuming that the functionality of the system is not adversely affected).

Embodiments of the invention are described herein in the context of one practical application, namely, an aircraft braking system having an antiskid control feature. In this context, the example technique is applicable to automatically detect the fore/aft orientation of a component mounted on the aircraft. Embodiments of the invention, however, are not limited to such aircraft applications, and the techniques described herein may also be utilized to detect directional orientations other than fore and aft.

The following description of example embodiments may utilize relative positional terminology such as "up," "down," "inboard," "outboard," "top," and "bottom." These terms may be utilized for consistency with the drawings and to simplify the description of the example embodiments. Use of these terms is not intended to restrict, limit, or narrow the scope or application of the example embodiments in any way.

FIG. 1 is a top schematic view of a prior art aircraft configuration 100 showing the general location of the aircraft landing gear and wheels. The system and method described herein can be applied to any number of aircraft configurations, including aircraft configuration 100. FIG. 1 depicts a top view of an aircraft 102 with the landing gear and wheels visible through the fuselage. In this example configuration 100, aircraft 102 includes a front landing gear 104, a left rear landing gear 106, and a right rear landing gear 108. Left rear landing gear 106 includes two outboard wheels 110 and two inboard wheels 112. Likewise, right rear landing gear 108 includes two outboard wheels 114 and two inboard wheels 116. In accordance with conventional aircraft design, aircraft 102 need not apply brakes to the wheels of front landing gear 104. Each wheel of left rear landing gear 106 and right rear landing gear 108, however, includes a respective brake mechanism, and aircraft 102 can apply brakes to each wheel in an independent manner. In practice, the pilot is able to apply left and/or right brakes, and an antiskid control system individually controls the brakes for each wheel.

In the example aircraft embodiment described herein, the braking system utilizes accelerometers to sense landing gear truck fore/aft accelerations for use an input to an antiskid control, which augments landing gear strut stability when antiskid control is active. In particular, the example embodiment employs axle-mounted remote data concentrators ("RDCs"). Each wheel of left rear landing gear 106 and right rear landing gear 108 has a corresponding RDC in this example. As described in more detail below, an RDC is generally configured to receive, measure, detect, or otherwise obtain data for processing and/or transmission to another aircraft system or subsystem. An RDC gathers data for transmission to another component via a suitable data communication link or path, such as a digital communication bus. Each RDC is installed at or near the end of each axle; thus, a given RDC may be mounted in an outboard location or an inboard location. In this example, each RDC includes an accelerometer that is preferably configured and oriented to detect fore/aft acceleration corresponding to the respective wheel upon which the accelerometer is mounted.

Figures 2, 3, 4:
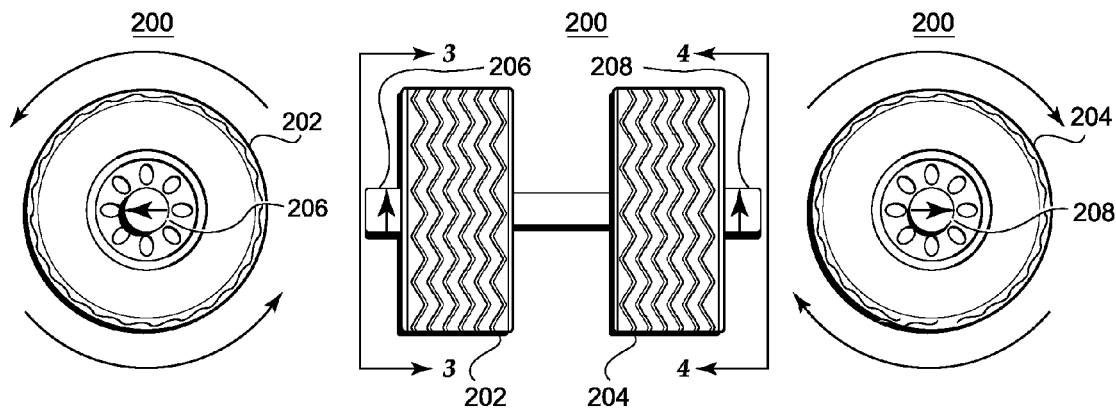
FIG. 2 is a top schematic view of an aircraft landing gear assembly having two axle-mounted remote data concentrators.
FIG. 3 is a side view of the aircraft landing gear assembly as viewed from line 3-3 in FIG. 2.
FIG. 4 is a side view of the aircraft landing gear assembly as viewed from line 4-4 in FIG. 2.

FIG. 2 is a top schematic view of an aircraft landing gear assembly 200 having two axle-mounted RDCs. Assembly 200 may, for example, represent an axle of left rear landing gear 106 or an axle of right rear landing gear 108 (see FIG. 1). In this example, assembly 200 includes a first wheel 202, a second wheel 204, a first RDC 206 corresponding to first wheel 202, and a second RDC 208 corresponding to second wheel 204. First wheel 202 or second wheel 204 may be an inboard wheel or an outboard wheel depending upon the location of assembly 200 relative to the aircraft. In this example deployment, each RDC is an axle-mounted RDC coupled to its respective wheel of the aircraft, and each RDC contains an accelerometer.

The arrows on RDC 206 and RDC 208 represent the forward (fore) direction of aircraft landing gear assembly 200. Each RDC includes a designated inner side (which faces the wheel) and a designated outer side, and the inner side serves as the mounting side for the RDC. Moreover, each RDC includes a designated top side (which faces the fuselage) and a designated bottom side. Therefore, once mounted, the forward orientation of RDC 206 relative to assembly 200 will oppose the forward orientation of RDC 208 relative to assembly 200. FIG. 3 and FIG. 4 illustrate this concept. FIG. 3 is a side view of assembly 200 as viewed from line 3-3 in FIG. 2, and FIG. 4 is a side view of assembly 200 as viewed from line 4-4 in FIG. 2. The arrows in FIG. 3 and FIG. 4 correspond to the respective arrows shown in FIG. 2. In other words, the forward orientation of RDC 206 is to the left in FIG. 3 relative to the mounting position of RDC 206, while the forward orientation of RDC 208 is to the right in FIG. 4 relative to the mounting position of RDC 208. Consequently, once RDC 206 (and/or the accelerometer in RDC 206) is configured for operation with wheel 202, it cannot be utilized for operation with wheel 204 unless it is reconfigured.

FIG. 5 is a schematic representation of an aircraft brake control system 300 configured in accordance with an example embodiment of the invention. Brake control system 300 may include a plurality of axle-mounted RDCs 302, a brake control unit 304 coupled to receive data from RDCs 302, and a plurality of wheel brake mechanisms 306 coupled to receive brake actuator control signals from brake control unit 304. In the example embodiment, brake control system 300 includes eight RDCs 302 (one for each rear landing gear wheel) and eight wheel brake mechanisms 306 (one for each rear landing gear wheel). Each RDC 302 may be suitably configured to obtain, generate, receive, sense, or detect data and/or signals corresponding to any number of measurable quantities, including, without limitation: wheel speed 308; rotational direction 310 of the wheel (e.g., clockwise or counterclockwise); brake temperature 312; and tire pressure 314. Each RDC 302 may include one or more suitably configured sensors (e.g., a wheel speed sensor, a rotation sensor, a temperature sensor, an air pressure sensor) and/or communicate with one or more external sensors or data sources. In example embodiments, wheel speed 308 may be conveyed in an appropriate speed value, such as RPM, radians per second, linear feet per second, or the like, and rotational direction 310 may be conveyed in any appropriate manner, for example, a flag or an indicator that represents clockwise ("CW") rotation or counterclockwise ("CCW") rotation of the wheel.

Although not depicted in FIG. 5, each RDC 302 may also include an accelerometer that has been initialized, configured, and installed in an appropriate manner. RDCs 302 may forward the measured data and the accelerometer data to brake control unit 304 for processing and generation of brake actuator signals for wheel brake mechanisms 306. In example embodiments, brake control unit 304 is suitably configured with antiskid control algorithms that utilize the accelerometer data to determine how best to generate brake actuator signals in response to the current conditions detected by RDCs 302.

FIG. 6 is a schematic representation of an axle-mounted RDC 400 configured in accordance with an example embodiment of the invention. RDC 400 may be utilized for each RDC 302 in FIG. 5. RDC 400 may generally include a processing architecture 402, a suitable amount of memory 404, a data communication module 406, an accelerometer 408, and one or more sensors 410. These components and modules may be coupled together via a bus 412 or any suitable interconnection arrangement.

Processing architecture 402 is suitably configured to support the functionality of RDC 400, and to carry out the various tasks, methods, and processing steps described herein. Processing architecture 402 and the various illustrative blocks, modules, processing logic, and circuits described in connection with the embodiments disclosed herein may be implemented or performed with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. A processor may be realized as a microprocessor, a controller, a microcontroller, or a state machine. A processor may also be implemented as a combination of computing devices, e.g., a combination of a digital signal processor and a microprocessor, a plurality of microprocessors, one or more microprocessors in conjunction with a digital signal processor core, or any other such configuration.

Memory 404 is generally configured to store data necessary to support the functionality of RDC 400. For example, memory 404 may be configured and controlled to store a wheel speed threshold value 414, a rotational direction indicator 416, a forward motion indicator 418, and/or other data utilized by RDC 400, the brake control system, or the aircraft. In example embodiments, memory 404 may be realized as RAM memory, flash memory, ROM memory, EPROM memory, EEPROM memory, registers, a hard disk, a removable disk, a CD-ROM, or any other form of storage medium known in the art. In this regard, memory 404 may be coupled to processing architecture 402 such that processing architecture 402 can read information from, and write information to, memory 404. In the alternative, memory 404 may be integral to processing architecture 402. As an example, processing architecture 402 and memory 404 may reside in an ASIC.

In the example implementation, data communication module 406 accommodates transfer of data from RDC 400 to the brake control unit of the aircraft. In addition, data communication module 406 may be configured to receive sensor input(s) 420 from any number sensors or sources that are external to RDC 400. As explained previously, accelerometer 408 is generally configured to measure acceleration of RDC 400 relative to one or more designated directions. When RDC 400 is mounted to an aircraft landing gear, accelerometer 408 can measure the fore/aft acceleration of the landing gear once the orientation of RDC 400 (and, therefore, the orientation of accelerometer 408) is configured. In this regard, FIG. 6 depicts a fore/aft orientation 422 for accelerometer 408, which may be maintained by RDC 400, by the brake control system, and/or by the aircraft in any suitable manner. Notably, the fore/aft orientation 422 can change depending upon the installation location and position of RDC 400 and this fore/aft orientation 422 can be determined whenever RDC 400 is powered up, which enables the aircraft to configure RDC 400 in a continuous or real-time manner. If RDC 400 itself maintains fore/aft orientation 422, memory 404 may store and update a fore/aft indicator (not shown) as needed. Otherwise, one or more other memory elements in the aircraft may be configured to store a fore/aft indicator for accelerometer 408.

In the example embodiment, sensors 410 are internal to RDC 400. Sensors 410 include a wheel speed sensor, which is configured to generate a speed value for the respective wheel of the aircraft, and a rotation sensor, which is configured to generate a rotational direction value for the wheel. Sensors 410 are coupled to processing architecture 402, which processes the measured data to automatically configure RDC 400 in the manner described herein. Briefly, RDC 400 detects the current wheel speed in the CW or CCW direction, and compares the detected wheel speed to a threshold speed value. If the magnitude of the wheel speed exceeds the threshold, then RDC 400 assumes that the aircraft is traveling forward and assigns a forward orientation to the rotational direction (CW or CCW). For example, if the CW wheel speed exceeds the threshold, then RDC 400 will equate CW rotation to forward motion.

Figure 7:
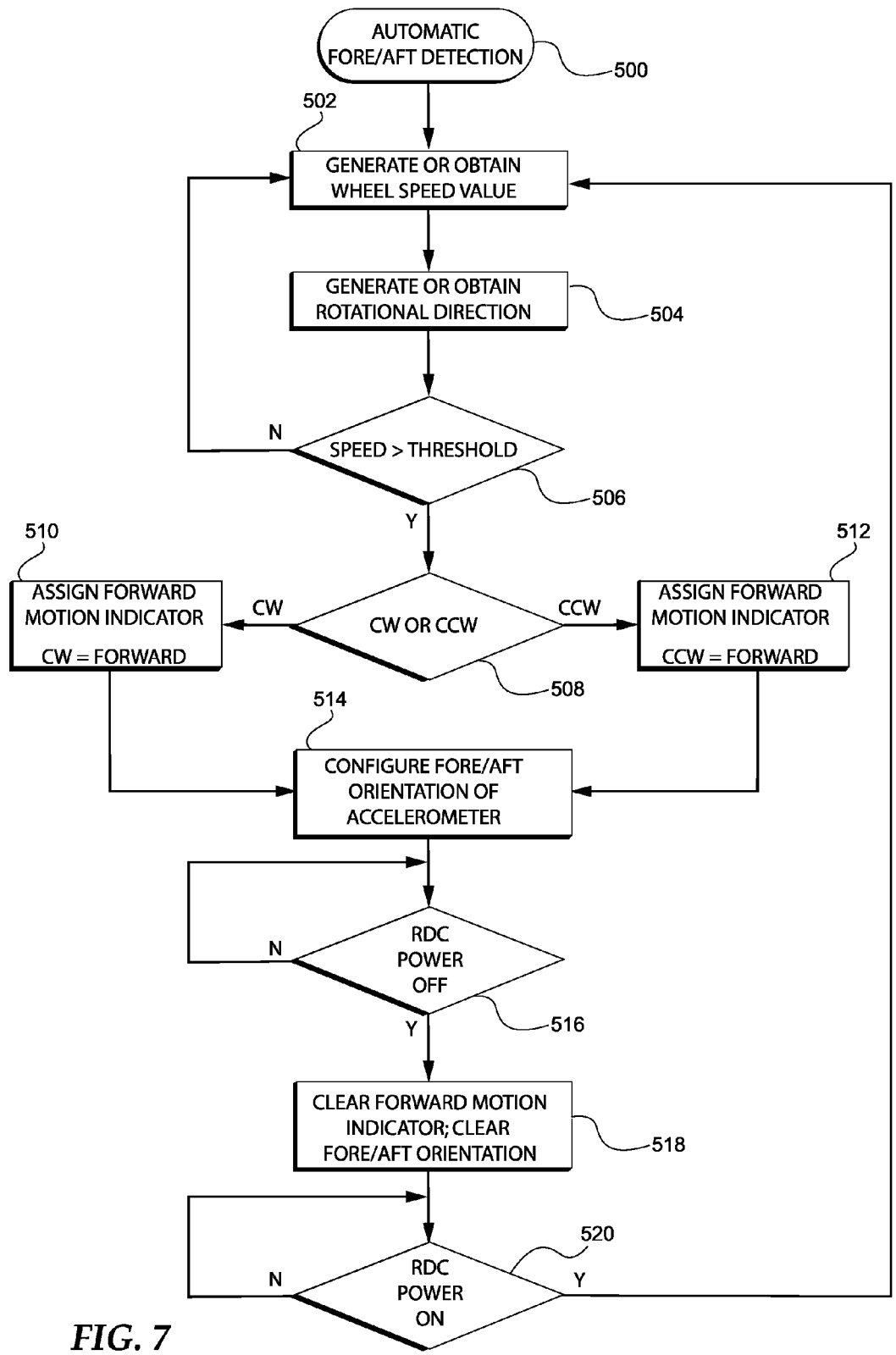
FIG. 7 is a flow chart of an example automatic fore/aft detection process.

FIG. 7 is a flow chart of an example automatic fore/aft detection process 500, which may be performed by an axle-mounted RDC as described above. Process 500 facilitates automatic detection of the direction of motion of an aircraft having axle-mounted RDCs. Process 500 also facilitates automatic configuration (setup) of axle-mounted RDCs having configurable accelerometers. The various tasks performed in connection with process 500 may be performed by software, hardware, firmware, or any combination thereof. For illustrative purposes, the following description of process 500 may refer to elements mentioned above in connection with FIGS. 1-6. In embodiments of the invention, portions of process 500 may be performed by different elements of the described system, e.g., processing architecture 402, sensors 410, memory 404, or the like. It should be appreciated that process 500 may include any number of additional or alternative tasks, the tasks shown in FIG. 7 need not be performed in the illustrated order, and process 500 may be incorporated into a more comprehensive procedure or process having additional functionality not described in detail herein.

In example embodiments, automatic fore/aft detection process 500 may be initiated in response to operation of the aircraft, whenever power is delivered to the RDCs, in response to motion of the aircraft, or the like. Indeed, process 500 may run continuously so long as the aircraft remains powered up. In the example embodiment, process 500 may be performed by each rear landing gear RDC on the aircraft. Process 500 may begin by generating or obtaining (at the RDC) the current wheel speed value for the respective wheel of the aircraft (task 502). The speed value may indicate an RPM value, a radians per second value, a linear feet per second value, or the like. In addition, process 500 generates or obtains (at the RDC) the current rotational direction of the wheel (task 504). In this example, the rotational direction will be either CW or CCW.

In example embodiments, the RDC may process the wheel speed value and the rotational direction in accordance with automatic fore/aft detection process 500. In this regard, process 500 may compare the current wheel speed value to a threshold value (query task 506). The threshold value represents a speed that is indicative of forward movement of the aircraft. For example, the threshold value may be indicative of a speed that is exceeded during forward taxi maneuvers or forward takeoff procedures, where that speed is not exceeded during reverse taxi maneuvers. Reverse taxi maneuvers rarely, if ever, exceed 5-10 miles per hour. Accordingly, the wheel speed comparison may be performed during aircraft taxi maneuvers—if the threshold value is set at 10 miles per hour and the measured wheel speed exceeds that threshold, process 500 can safely assume that the aircraft is traveling in the forward direction. If query task 506 determines that the wheel speed does not exceed the threshold, then process 500 may return to task 502 to continue monitoring the wheel speed and the rotational direction. In other words, if the wheel speed does not exceed the threshold, process 500 will leave the direction of motion undefined.

If query task 506 determines that the wheel speed exceeds the threshold value, then automatic fore/aft detection process 500 may proceed to correlate forward motion to the current rotational direction (CW or CCW). If the detected rotational direction of the wheel is CW (query task 508), then process 500 may assign a forward motion indicator to the CW direction, as indicated by task 510. On the other hand, if the detected rotational direction of the wheel is CCW, then process 500 may assign a forward motion indicator to the CCW direction, as indicated by task 512. In addition, process 500 may electronically configure the fore/aft orientation of the accelerometer used by the respective RDC (task 514). As mentioned above, the system may assign a suitable fore/aft indicator to the accelerometer to indicate its current forward orientation such that the accelerometer data can be intelligently interpreted by the aircraft control systems, e.g., the brake control system.

In example embodiments, process 500 maintains the designated fore/aft orientation for the accelerometer while the respective RDC remains powered. If the RDC power is not shut off (query task 516), then process 500 may preserve the current forward motion indicator for the rotational direction determined in task 504, preserve the current fore/aft orientation for the accelerometer, and repeat query task 516 to continue monitoring for a power off condition. In response to a power off condition, process 500 may clear the forward motion indicator and/or clear the fore/aft orientation for the accelerometer (task 518) and proceed to a query task 520.

Query task 520 monitors for a subsequent power on condition. In this regard, FIG. 7 depicts a loop for query task 520; this loop represents an idle state where RDC is powered down. If query task 520 detects a power on state, then automatic fore/aft detection process 500 may be re-entered at task 502 to repeat the procedure for the current sensor data. Thus, the RDC can be reconfigured each time it is powered up. This is desirable for practical applications where a "generic" RDC can be installed in different locations on the aircraft or on different aircraft. For example, process 500 is suitable for use with an RDC that can be mounted in a left outboard location, a left inboard location, a right outboard location, or a right inboard location as mentioned in the above description of FIG. 1.

While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way. Rather, the foregoing detailed description will provide those skilled in the art with a convenient road map for implementing the described embodiment or embodiments. It should be understood that various changes can be made in the function and arrangement of elements without departing from the scope of the invention, where the scope of the invention is defined by the claims, which includes known equivalents and foreseeable equivalents at the time of filing this patent application.

What is claimed is:

1. A method for detecting direction of motion of an aircraft having an axle-mounted remote data concentrator ("RDC") coupled to a wheel of the aircraft, the method comprising:
   equipping said RDC with an accelerometer;
   configuring a fore/aft orientation for the accelerometer in response to a forward motion indication;
   maintaining the fore/aft orientation for the accelerometer while the RDC remains powered;
   obtaining, at the RDC, a speed value and rotational direction for the wheel of the aircraft;
   comparing the speed value to a threshold value; and
   assigning a forward motion indicator to said rotational direction if the speed value exceed the threshold value by a processor.

2. A method according to claim 1, further comprising detecting, at the RDC, the speed value for the wheel of the aircraft.

3. A method according to claim 1, further comprising detecting, at the RDC, the rotational direction for the wheel of the aircraft.

4. A method according to claim 1, further comprising receiving, at the RDC, the speed value for the wheel of the aircraft, the speed value being generated by a source external to the RDC.

5. A method according to claim 1, further comprising receiving, at the RDC, the rotational direction for the wheel of the aircraft, the rotational direction being generated by a source external to the RDC.

6. A method according to claim 1, wherein:
   comparing the speed value to the threshold value occurs during aircraft taxi maneuvers; and
   the threshold value is indicative of a speed of the aircraft that is exceeded during forward taxi maneuvers and that is not exceeded during reverse taxi maneuvers.

7. A method for automatically detecting direction of motion for an axle-mounted remote data concentrator ("RDC") coupled to a wheel of an aircraft, the method comprising:
   processing, by the RDC, a speed value and a clockwise-counterclockwise rotational direction indicator for the wheel of the aircraft;
   comparing the speed value to a threshold value during aircraft taxi maneuvers; said threshold value is indicative of a speed of the aircraft that is exceeded during forward taxi maneuvers and that is not exceeded during reverse taxi maneuvers; and
   correlating forward motion to the clockwise-counterclockwise . . . threshold value by a processor.

8. A method according to claim 7, wherein:
   the RDC includes an accelerometer; and
   the method further comprises determining a fore/aft orientation for the accelerometer in response to the correlating step.

9. A system for automatically detecting direction of motion for an axle-mounted remote data concentrator ("RDC") coupled to a wheel of an aircraft, the system comprising:

a wheel speed sensor configured to generate a speed value for the wheel of the aircraft;

a rotation sensor configured to generate a clockwise or counterclockwise rotational direction for the wheel of the aircraft; and a processing architecture coupled to the wheel speed sensor and to the rotation sensor, the processing architecture being configured to compare the speed value to a threshold value during aircraft taxi maneuvers, said threshold value is indicative of a speed of the aircraft that is exceeded during forward taxi maneuvers and that is not exceeded during reverse taxi maneuvers, and to correlate forward motion to the clockwise or counterclockwise . . . threshold value by a processor.

10. A system according to claim 9, further comprising an accelerometer coupled to the processing architecture, wherein the processing architecture is configured to assign a fore/aft indicator to the accelerometer to indicate a forward orientation.

11. A system according to claim 9, further comprising a memory module coupled to the processing architecture, the memory module being configured to store the fore/aft indicator.

* * * * *